(12) United States Patent
Luenser

(10) Patent No.: US 7,891,123 B1
(45) Date of Patent: Feb. 22, 2011

(54) DECORATIVE FRAME AND HANGING ELEMENT FOR RECORDED MEDIA CASES UTILIZING A SINGLE SHEET OF PRINTED MATTER

(76) Inventor: Carl D. Luenser, 12757 Mozart St., Blue Island, IL (US) 60406-1920

( * ) Notice: Subject to any disclaimer, the term of this patent is extended or adjusted under 35 U.S.C. 154(b) by 46 days.

(21) Appl. No.: 12/074,495

(22) Filed: Mar. 3, 2008

(51) Int. Cl.
*G09F 3/00* (2006.01)

(52) U.S. Cl. .............................. 40/312; 40/539; 40/786; 206/308.1

(58) Field of Classification Search ........... 40/786–789, 40/539, 124.09, 761
See application file for complete search history.

(56) References Cited

U.S. PATENT DOCUMENTS

| | | | |
|---|---|---|---|
| 1,575,720 A * | 3/1926 | Duer Scott John | ............ 40/701 |
| 2,505,787 A | 5/1950 | Munkacsi et al. | |
| 4,041,630 A | 8/1977 | Holbrook | |
| 4,309,835 A * | 1/1982 | Naeve | ......................... 40/310 |
| D288,630 S | 3/1987 | Haugen | |
| D381,211 S | 7/1997 | Aries et al. | |
| 5,915,734 A | 6/1999 | Minehart | |
| D509,367 S | 9/2005 | Kennedy | |
| 7,478,491 B2 * | 1/2009 | Sturba et al. | ............. 40/124.16 |

* cited by examiner

*Primary Examiner*—Cassandra Davis
(74) *Attorney, Agent, or Firm*—Richard L. Miller, Registered Patent Agent

(57) ABSTRACT

An insert for framing a standard sized DVD face paper insert/standard compact disc picture/booklet insert inserted into a standard jewel box case and for hanging the standard jewel box case, including a generally rectangular single sheet of paper. The generally rectangular single sheet of paper includes a hanging portion and a framing portion. The hanging portion is separatable from the framing portion along a cut line. The framing portion has a frame. In a first embodiment, the frame folds over the standard sized DVD face paper insert at all four sides once the standard sized DVD face paper insert is placed on the framing portion, to thereby form a framed standard sized DVD face paper insert for insertion into a front half of a DVD case. In a second embodiment, an inner side of the frame does not overlap the standard compact disc picture/booklet insert, but rather folds onto itself to form a flap that abuts the standard compact disc picture/booklet insert and covers a hinge portion of the front half of the standard jewel box when slid into a front half of the standard jewel box case.

4 Claims, 4 Drawing Sheets

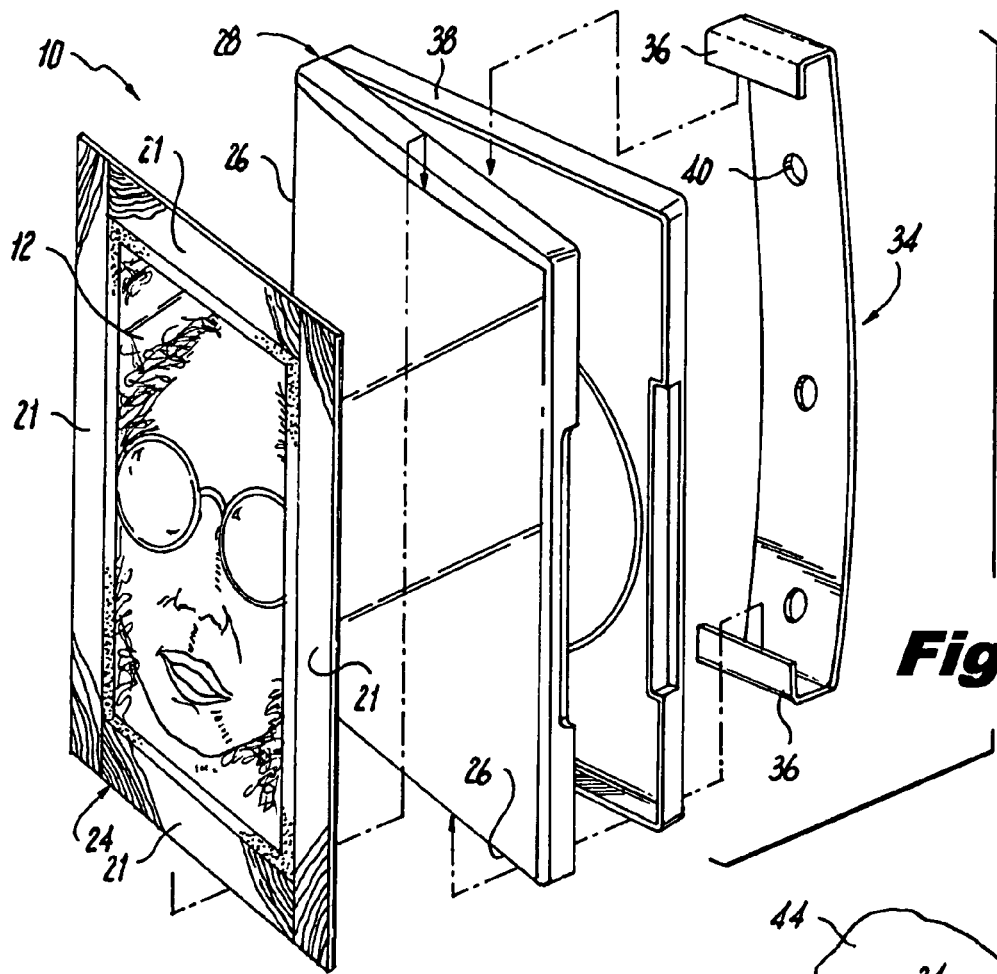
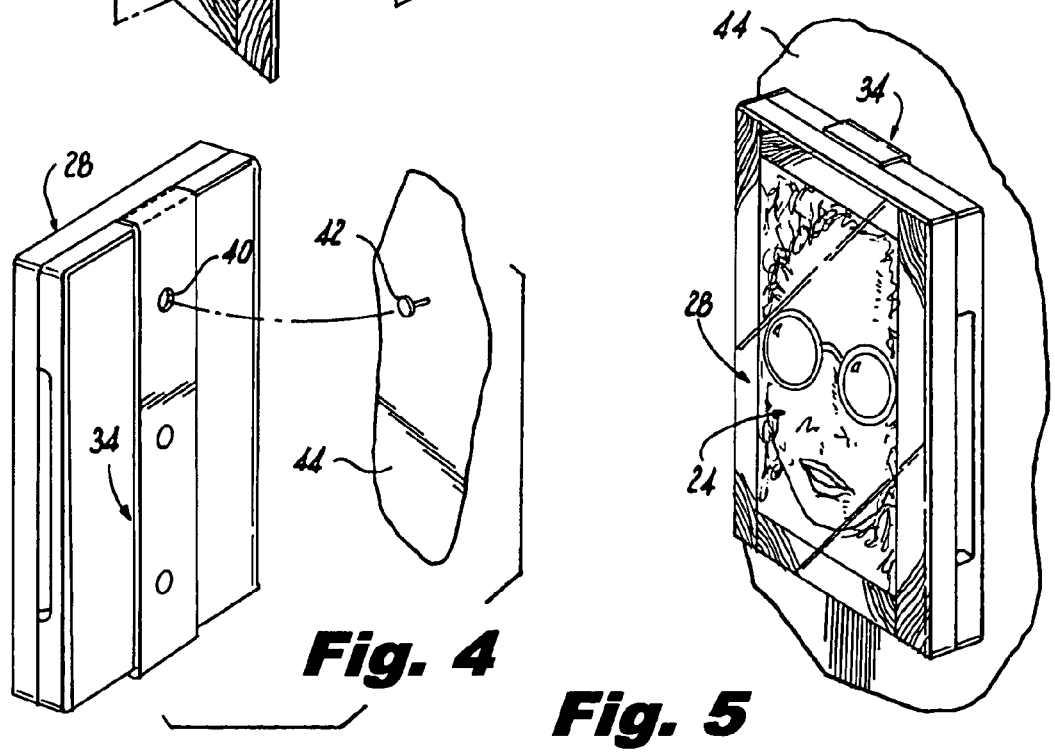
Fig. 3
Fig. 4
Fig. 5

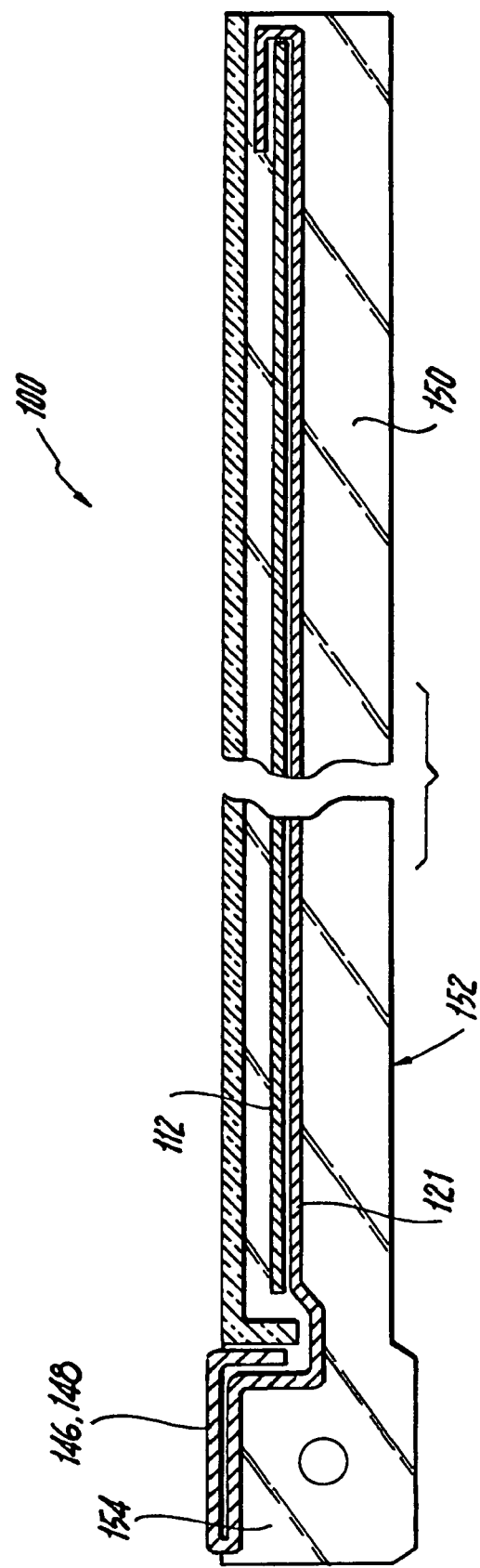

DECORATIVE FRAME AND HANGING ELEMENT FOR RECORDED MEDIA CASES UTILIZING A SINGLE SHEET OF PRINTED MATTER

1. BACKGROUND OF THE INVENTION

A. Field of the Invention

The embodiments of the present invention relate to an insert, and more particularly, the embodiments of the present invention relate to an insert for framing either a standard compact disc picture/booklet insert, a standard sized DVD face paper insert, or a photograph inserted into a standard jewel box case and for hanging the standard jewel box case.

B. Description of the Prior Art

Numerous innovations for combination media cases and artwork have been provided in the prior art, which will be described below in chronological order to show advancement in the art, and which are incorporated herein by reference thereto. Even though these innovations may be suitable for the specific individual purposes to which they address, however, they differ from the present invention in that they do not teach an insert for framing either a standard compact disc picture/booklet insert, a standard sized DVD face paper insert, or a photograph inserted in a standard jewel box case and for hanging the standard jewel box case.

(1) U.S. Pat. No. 2,505,787 to Munkacsi et al.

U.S. Pat. No. 2,505,787 issued to Munkacsi et al. on May 2, 1950 in class 274 and subclass 42 teaches an article of manufacture having a plate of a synthetic plastic material and a spiral sound track record cut in one face of the plate. A positive photograph emulsion is on one face of the plate to provide a direct positive image having opaque and transparent portions. An opening in the plate allows insertion of the plate over the spindle of a record player. A flexible flap is integral with the plate and wholly covers the opening when the plate is not on the spindle. A part of the image covers the flap.

(2) U.S. Pat. No. 4,041,630 to Holbrook.

U.S. Pat. No. 4,041,630 issued to Holbrook on Aug. 16, 1977 in class 40 and subclass 152.1 teaches a rectangular and open album frame including parallel upper and lower sections secured to parallel first and second side sections. Each of the upper, lower, and first side sections has an elongated groove defined on an inner side thereof to further define generally C-shaped composite mounting grooves adapted to retain an album cover or the like therein. An elongated slot is formed through the second side section to extend substantially the full length thereof, whereby the album cover may be inserted through the slot and disposed in the frame for display purposes. A clip-type hanger has a first leg that may be inserted upwardly into the groove defined in the upper section of the frame and a parallel and spaced second leg connected to the first leg and adapted to be secured to a wall or the like.

(3) U.S. Pat. No. Des. 288,630 to Haugen.

U.S. Pat. No. Des. 288,630 issued to Haugen on Mar. 10, 1987 in class D6 and subclass 300 teaches the ornamental design for photograph record display frame or similar article.

(4) U.S. Pat. No. Des. 381,211 to Aries et al.

U.S. Pat. No. Des. 381,211 issued to Aries et al. on Jul. 22, 1997 in class D6 and subclass 300 teaches the ornamental design for a framed record.

(5) U.S. Pat. No. 5,915,734 to Minehart.

U.S. Pat. No. 5,915,734 issued to Minehart on Jun. 29, 1999 teaches a personalized, user assembled, greeting card, including a manually usable holder for detachably receiving a sound recording. The sound recording is user selected from a variety of available sound recordings, and is placed by the user in the holder for manual detachment by a recipient. A greeting card and sound recording display and dispenser system is also provided, with a first display section having card receptacles for releasably receiving and presenting a plurality of greeting cards for display and selection by a user. A second display section has sound recording receptacles for releasably receiving and presenting a plurality of sound recordings for selection by the user. A process is also described in which greeting cards and sound recordings are presented for user assembly in a combination to present a personalized greeting card and sound recording combination to a recipient. The steps include providing a selections of cards and sound recordings, in which the sound recordings are capable of being carried by the cards. The process further includes steps in selecting a sound recording, and combining the sound recording with the selected greeting card to produce a personalized greeting and sound recording combination.

(6) U.S. Pat. No. D509,367 to Kennedy.

U.S. Pat. No. D509,367 issued to Kennedy on Sep. 13, 2005 in class D6 and subclass 300 teaches the ornamental design for the CD and picture frame.

It is apparent that numerous innovations for combination media cases and artwork have been provided in the prior art that are adapted to be used. Furthermore, even though these innovations may be suitable for the specific individual purposes to which they address, however, they would not be suitable for the purposes of the embodiments of the present invention as heretofore described, namely, an insert for framing either a standard compact disc picture/booklet insert, a standard sized DVD face paper insert, or a photograph inserted in a standard jewel box case and for hanging the standard jewel box case.

2. SUMMARY OF THE INVENTION

Thus, an object of the embodiments of the present invention is to provide an insert for framing either a standard compact disc picture/booklet insert, a standard sized DVD face paper insert, or a photograph inserted into a standard jewel box case and for hanging the standard jewel box case, which avoids the disadvantages of the prior art.

Briefly stated, another object of the embodiments of the present invention is to provide an insert for framing a standard sized DVD face paper insert/standard compact disc picture/booklet insert inserted into a standard jewel box case and for hanging the standard jewel box case, including a generally rectangular single sheet of paper. The generally rectangular single sheet of paper includes a hanging portion and a framing portion. The hanging portion is separatable from the framing portion along a cut line. The framing portion has a frame. In a first embodiment, the frame folds over the standard sized DVD face paper insert at all four sides once the standard sized DVD face paper insert is placed on the framing portion, to thereby form a framed standard sized DVD face paper insert for insertion into a front half of a DVD case. In a second embodiment, an inner side of the frame does not overlap the standard compact disc picture/booklet insert, but rather folds onto itself to form a flap that abuts the standard compact disc picture/booklet insert and covers a hinge portion of the front half of the standard jewel box when slid into a front half of the standard jewel box case.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

3. BRIEF DESCRIPTION OF THE DRAWING

The figures of the drawing are briefly described as follows:

FIG. 3 is an exploded diagrammatic perspective view of the first embodiment of the present invention during final assembly;

FIG. 4 is a diagrammatic perspective view of the first embodiment of the present invention being hung on a wall;

FIG. 5 is a diagrammatic perspective view of the first embodiment of the present invention hung on a wall;

FIG. 8 is an enlarged diagrammatic cross sectional view, with parts broken away taken along LINE 8-8 in FIG. 7.

4. LIST OF REFERENCE NUMERALS UTILIZED IN THE DRAWING

A. General

Figure 1:
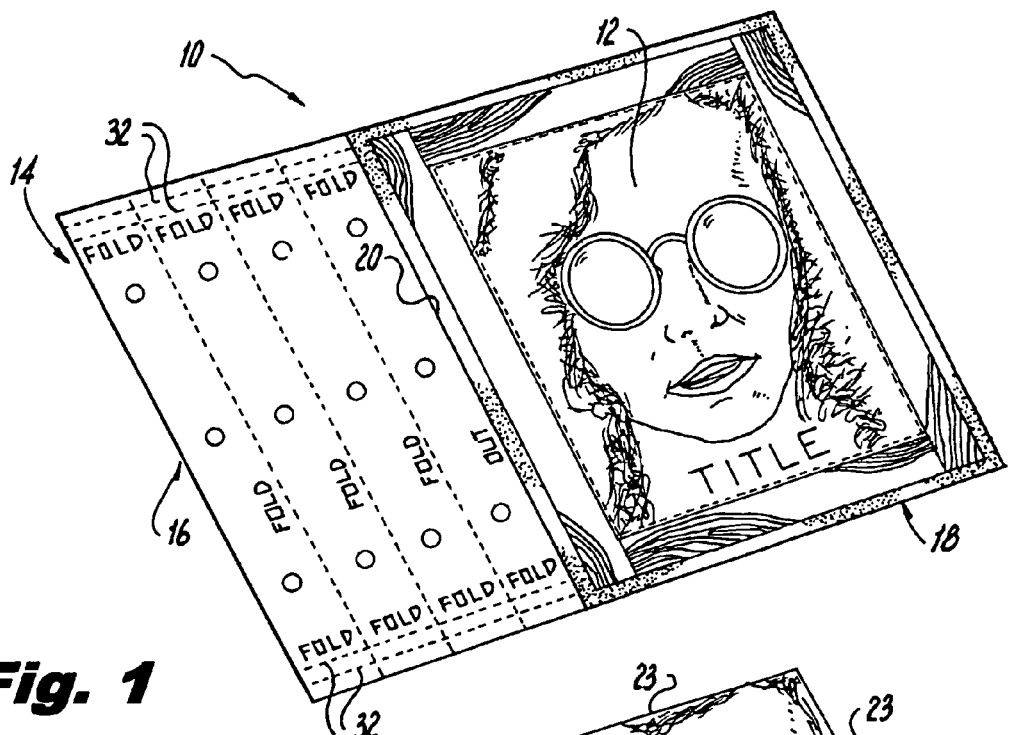
FIG. 1 is a diagrammatic perspective view of a first embodiment of the present invention prior to assembly.

10 insert of first embodiment of present invention for framing standard sized DVD face paper insert 12 inserted into DVD case 28 and for hanging DVD case 28
12 standard sized DVD face paper insert

B. First Embodiment

14 generally rectangular single sheet of paper 14
16 hanging portion of generally rectangular single sheet of paper 14
18 framing portion of generally rectangular single sheet of paper 14
20 cut line of generally rectangular single sheet of paper 14
20 perimeter of framing portion 18 of generally rectangular single sheet of paper 14
21 frame of framing portion 18 of generally rectangular single sheet of paper 14
22 perimeter fold lines of framing portion 18 of generally rectangular single sheet of paper 14 defining frame 21 of framing portion 18 of generally rectangular single sheet of paper 14
23 all four sides of standard sized DVD face paper insert 12
24 framed standard sized DVD face paper insert for insertion into front half 26 of DVD case 28
26 front half of DVD case 28
28 DVD case
30 plurality of axial fold lines of hanging portion 16 of generally rectangular single sheet of paper 14
32 plurality of end fold lines of hanging portion 16 of generally rectangular single sheet of paper 14
34 hanger
36 ends of hanger 34 for capturing in back half 38 of DVD case 28 and maintained thereat when DVD case 28 is closed
38 back half of DVD case 28
40 plurality of through bores 40 in hanger 34 for receiving nail 42 for hanging on wall 44
42 nail
44 wall

C. Second Embodiment

100 insert
112 standard compact disc picture/booklet insert
121 frame
146 inner side of frame 121
148 flap
150 front half of standard jewel box case 152
152 standard jewel box case
154 hinge portion of front half 150 of standard jewel box 152

5. DETAILED DESCRIPTION OF THE PREFERRED EMBODIMENTS

A. General

Referring now to the figures, in which like numerals indicate like parts, and particularly to FIG. 1, which is a diagrammatic perspective view of a first embodiment of the present invention prior to assembly, the insert of the first embodiment of the present invention is shown generally at 10 for framing a standard sized DVD face paper insert 12 inserted into a DVD case and for hanging the DVD case.

It is to be understood that the standard sized DVD face paper insert 12 may be replaced by, or contain, an advertisement.

B. First Embodiment

The insert 10 comprises a generally rectangular single sheet of paper 14. The generally rectangular single sheet of paper 14 comprises a hanging portion 16 and a framing portion 18. The hanging portion 16 of the generally rectangular single sheet of paper 14 is separatable from the framing portion 18 of the generally rectangular single sheet of paper 14 along a cut line 20 of the generally rectangular single sheet of paper 14.

Figure 2:
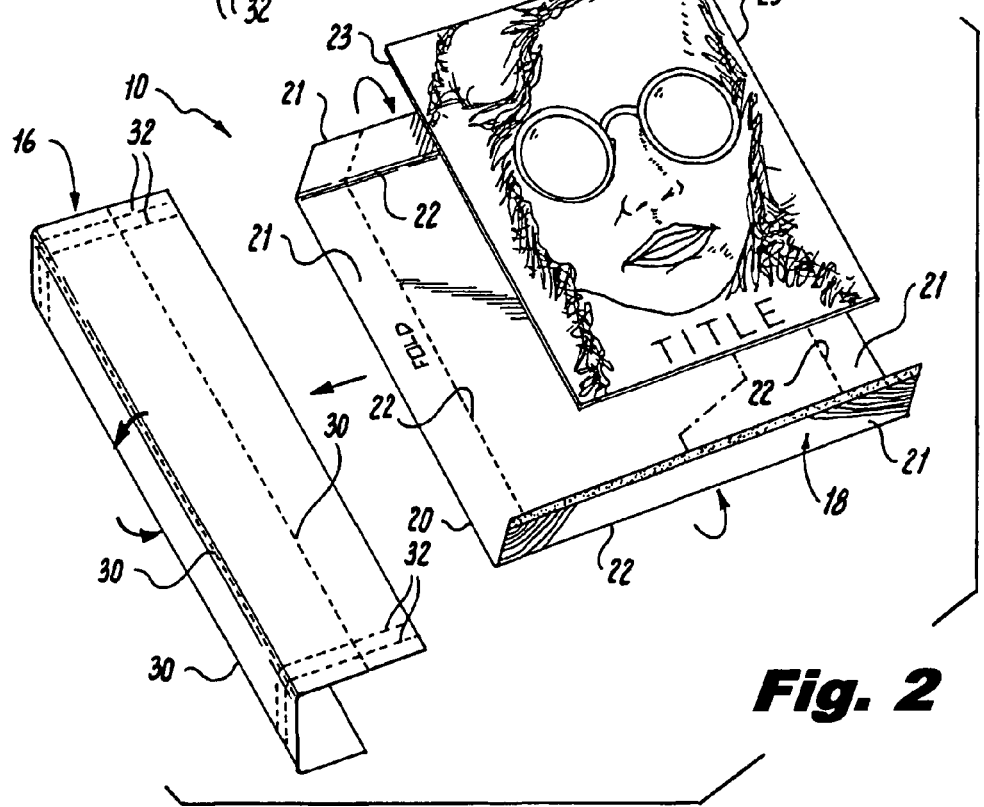
FIG. 2 is an exploded diagrammatic perspective view of the first embodiment of the present invention during initial assembly.

As shown in FIGS. 2 and 3, which are, respectively, an exploded diagrammatic perspective view of the first embodiment of the present invention during initial assembly, and an exploded diagrammatic perspective view of the first embodiment of the present invention during final assembly, the framing portion 18 of the generally rectangular sheet of paper 14 has a perimeter 20.

The framing portion 18 of the generally rectangular single sheet of paper 14 further has a frame 21 defined by perimeter fold lines 22. The perimeter fold lines 22 of the framing portion 18 of the generally rectangular single sheet of paper 14 are inboard of the perimeter 20 of the framing portion 18 of the generally rectangular single sheet of paper 14.

The frame 21 of the framing portion 18 of the generally rectangular sheet of paper 14 folds over the standard sized DVD face paper insert 12, at the perimeter fold lines 22 of the framing portion 18 of the generally rectangular single sheet of paper 14, and at all four sides 23 of the standard sized DVD face paper insert 12, once the standard sized DVD face paper insert 12 is placed on the framing portion 18 of the generally rectangular single sheet of paper 14, to thereby form a framed standard sized DVD face paper insert 24 for insertion into a front half 26 of a DVD case 28 (FIG. 3).

The hanging portion 16 of the generally rectangular sheet of paper 14, once separated from the framing portion 18 of the generally rectangular sheet of paper 14, is folded onto itself along a plurality of axial fold lines 30 to form a partial hanger having ends folded onto themselves along a plurality of end fold lines 32 to form a hanger 34 whose ends 36 are for capturing in a back half 38 of the DVD case 28 (FIG. 3) and are maintained thereat when the DVD case 28 is closed.

As shown in FIGS. 4 and 5, which are, respectively, a diagrammatic perspective view of the first embodiment of the present invention being hung on a wall, and a diagrammatic perspective view of the first embodiment of the present invention hung on a wall, the hanger 34 contains a plurality of through bores 40 for receiving a nail 42 for hanging on a wall 44.

C. Second Embodiment

Figure 6:
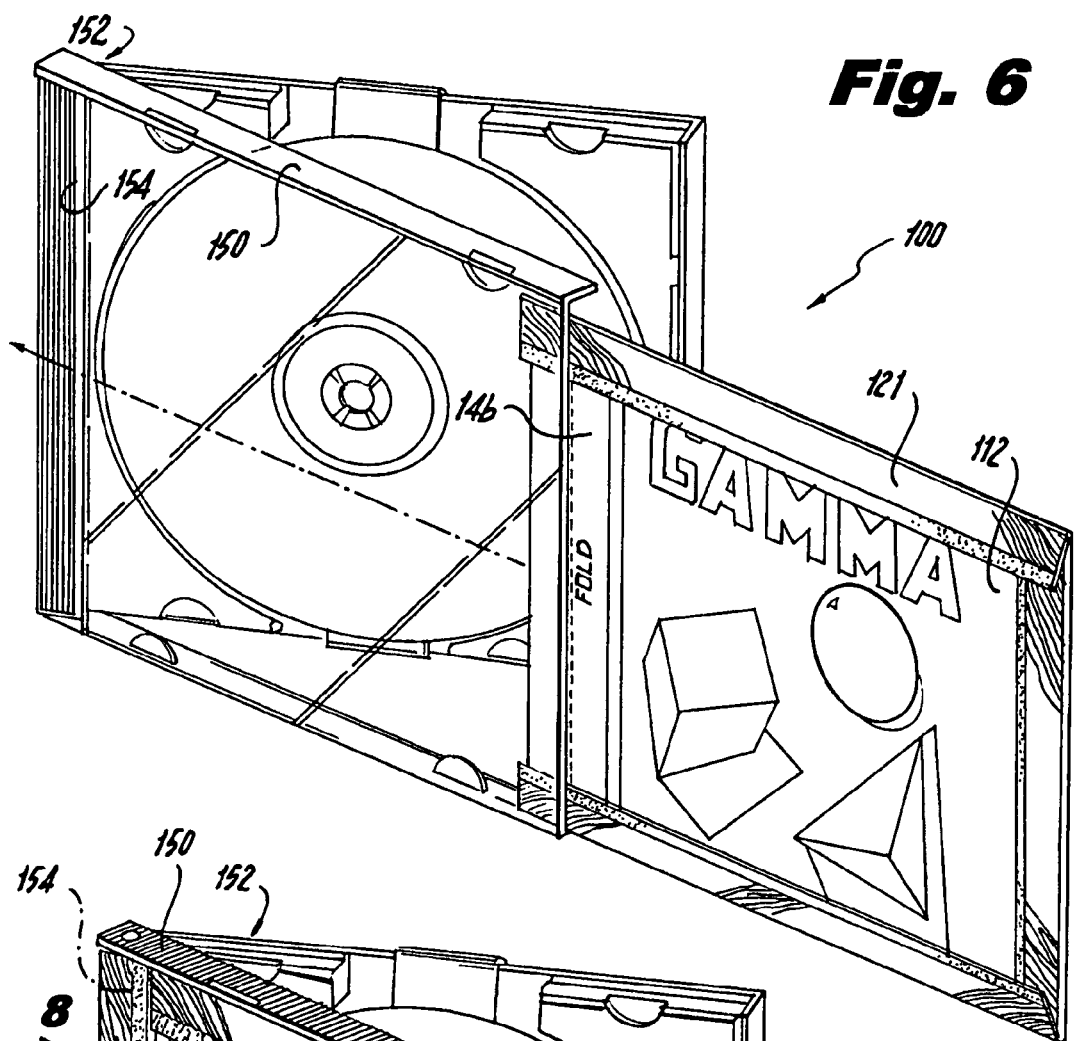
FIG. 6 is a diagrammatic view of a second embodiment of the present invention during assembly.
Figure 7:
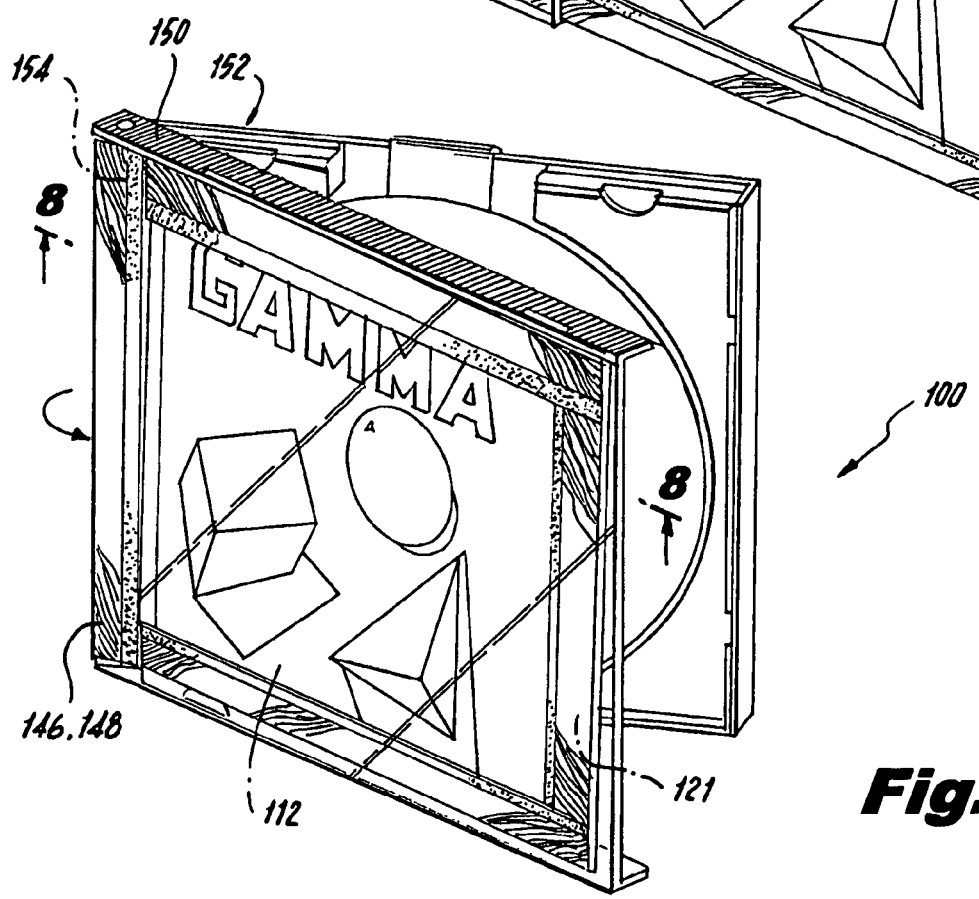
FIG. 7 is a diagrammatic view of a second embodiment of the present invention assembled.

The second embodiment of the insert 100 can best be seen in FIGS. 6-8, which are, respectively, a diagrammatic view of a second embodiment of the present invention during assembly, a diagrammatic view of a second embodiment of the present invention assembled, and an enlarged diagrammatic cross sectional view taken along LINE 8-8 in FIG. 7, and as such, will be discussed with reference thereto.

The insert 100 is similar to the insert 10, except that:
The standard sized DVD face paper insert 12 is replaced with a standard compact disc picture/booklet insert 112. It is to be understood that the standard compact disc picture/booklet insert 112 may be replaced by, or contain, an advertisement.
An inner side 146 of the frame 121 does not overlap the standard compact disc picture/booklet insert 112, but rather folds onto itself to form a flap 148, which abuts the standard compact disc picture/booklet insert 112, and when slid into a front half 150 of the standard jewel box case 152, cosmetically covers an exposed hinge portion 154 of the front half 150 of the standard jewel box 152.

D. Conclusions

It will be understood that each of the elements described above or two or more together may also find a useful application in other types of constructions differing from the types described above.

While the embodiments of the present invention have been illustrated and described as embodied in an insert for framing either a standard compact disc picture/booklet insert, a standard sized DVD face paper insert, or a photograph inserted into a standard jewel box case and for hanging the standard jewel box case, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A CD or DVD jewel case and blank for framing an insert selected from the group consisting of a standard sized DVD face paper insert and a standard compact disc picture/booklet insert inserted into the jewel box case and for hanging the jewel box case, comprising:
   jewel box having a front and rear half and
   a generally rectangular single sheet of paper;
   wherein said generally rectangular single sheet of paper comprises:
   a) a hanging portion; and
   b) a framing portion is separable from said hanging portion along a cut line;
   wherein said framing portion of said generally rectangular sheet of paper has frame members defined by perimeter fold lines located inboard of the perimeter edges of said framing portion, said frame members are adapted to fold about said perimeter fold line and over the standard sized DVD face paper insert or a standard compact disc picture/booklet insert at all four sides; once the standard sized DVD face paper insert or standard compact disc picture/booklet insert is placed on said framing portion, the framed standard sized DVD face paper insert or standard compact disc picture/booklet insert can be inserted into the front half of the DVD or CD jewel case,
   wherein said hanging portion, once separated from said framing portion, is adapted to fold onto itself along a plurality of axial fold lines to form a partial hanger;
   wherein said partial hanger of said hanging portion has ends which are folded onto themselves along a plurality of end fold lines to form a hanger whose ends are for capturing between the front and back half of the DVD or CD jewel case and are maintained thereat when the jewel case is closed.

2. The insert of claim 1, wherein said hanger contains a plurality of through bores for receiving a nail for hanging on a wall.

3. The insert of claim 1, wherein an inner side of said frame does not overlap the standard compact disc picture/booklet insert.

4. The insert of claim 1, wherein said inner side of said frame folds onto itself to form a flap.

\* \* \* \* \*